United States Patent [19]

Peyre

[11] Patent Number: 5,787,764
[45] Date of Patent: Aug. 4, 1998

[54] BICYCLE PEDAL INCLUDING A BLOCK OF RESILIENT MATERIAL

[75] Inventor: Henri Peyre, Saint Benin d'Azy, France

[73] Assignee: Look Cycle, Nevers, France

[21] Appl. No.: 766,948

[22] Filed: Dec. 16, 1996

[30] Foreign Application Priority Data

Dec. 18, 1995 [FR] France ............................. 95 14952

[51] Int. Cl.⁶ ........................................... G05G 1/14
[52] U.S. Cl. ............................ 74/594.6; 74/594.4
[58] Field of Search ........................ 74/594.6, 594.4

[56] References Cited

U.S. PATENT DOCUMENTS

| | | | |
|---|---|---|---|
| 5,060,537 | 10/1991 | Nagano | 74/594.6 |
| 5,105,683 | 4/1992 | Mercat et al. | 74/594.4 X |
| 5,159,853 | 11/1992 | Gibson | 74/594.6 |
| 5,203,229 | 4/1993 | Chen | 74/594.6 |
| 5,259,270 | 11/1993 | Lin | 74/594.6 |
| 5,377,564 | 1/1995 | Daieli | 74/594.6 |

FOREIGN PATENT DOCUMENTS

| | | |
|---|---|---|
| 0 359 845 | 3/1990 | European Pat. Off. . |
| 0 393 586 | 10/1990 | European Pat. Off. . |
| 90 00 984.3 | 5/1990 | Germany . |

Primary Examiner—Rodney H. Bonck
Assistant Examiner—William C. Joyce
Attorney, Agent, or Firm—Young & Thompson

[57] ABSTRACT

An automatic bicycle pedal comprises a fixed front locking arrangement 3 to lock the end of a cleat on a cyclist's shoe and a movable locking arrangement 4 to lock the rear end of the cleat. The movable arrangement 14, prestressed by a resilient block 5, is displaceable under the pressure of the cyclist's shoe between an open position permitting the insertion of the cleat between the two arrangements 3 and 4 and a closed position ensuring the securement of the cleat of the shoe to the automatic pedal. The resilient block 5 of e.g. elastomer is compressed between two walls 6 and 7 that are movable relative to each other.

20 Claims, 4 Drawing Sheets

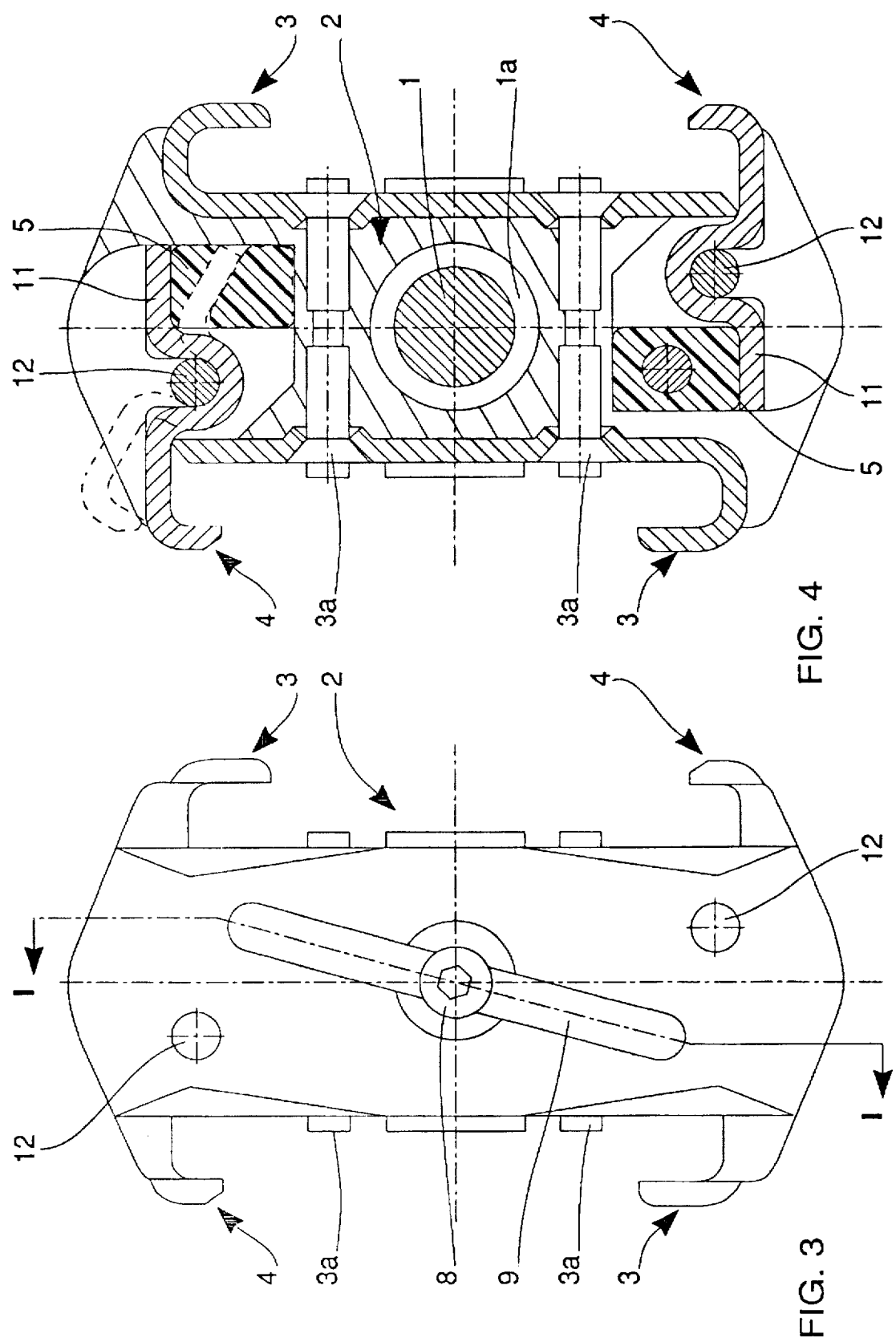

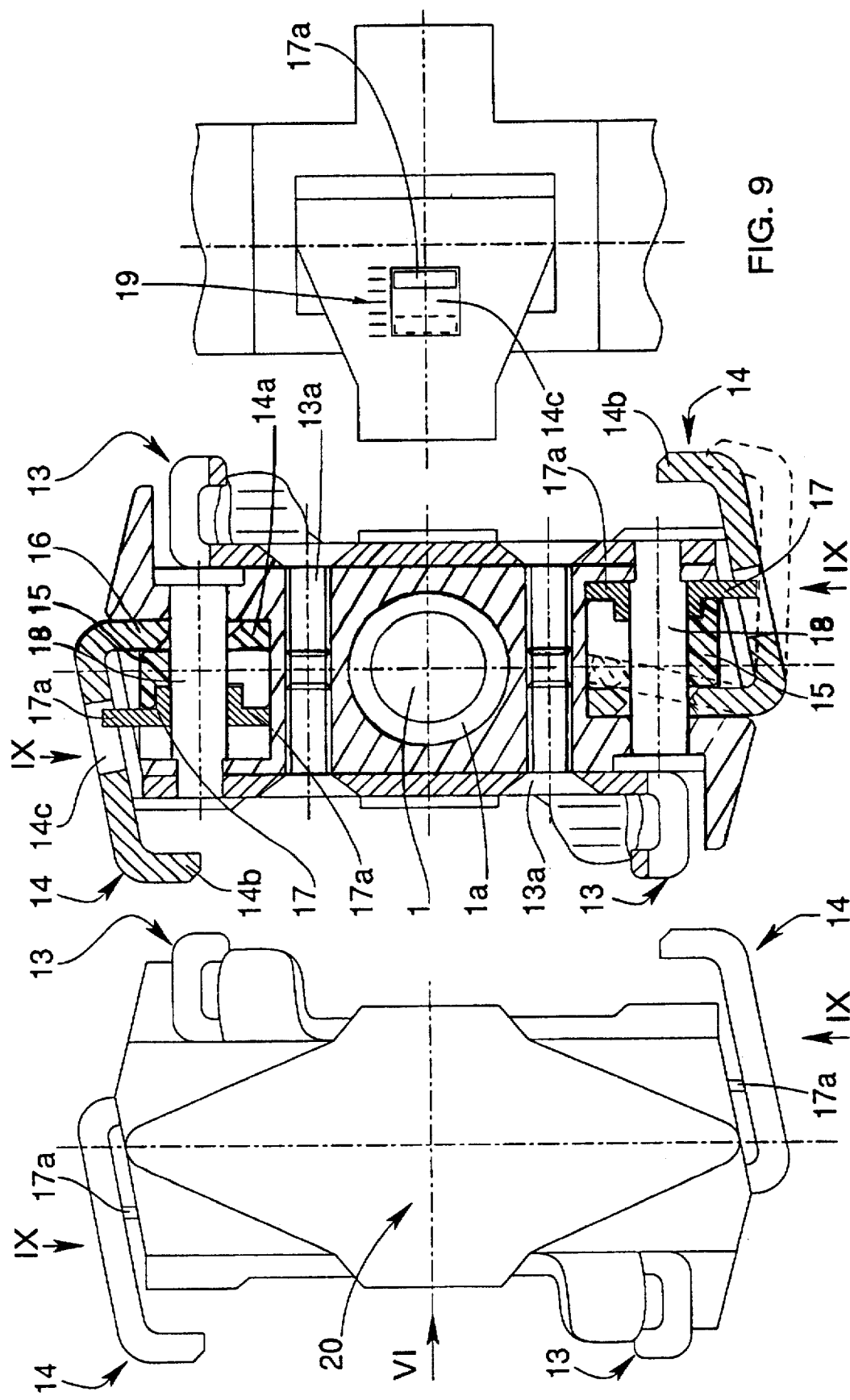

BICYCLE PEDAL INCLUDING A BLOCK OF RESILIENT MATERIAL

This application corresponds to French application 95.14952 of Dec. 18, 1995, the disclosure of which is incorporated herein by reference.

FIELD OF THE INVENTION

The invention relates to an automatic bicycle pedal, particularly for use in road cycling or all-terrain travel.

BACKGROUND OF THE INVENTION

Pedals are known that coact with cyclist's shoes each provided with a securement device. These pedals are of plastic material or of light alloy and are mounted rotatably on a pedal lever by lateral flanges and extend below a bearing plate on which the shoe is applied with pressure. This bearing plate is of open work to lighten the pedal as much as possible, and generally comprises at the front a guide lug and a fixed claw provided with a hooking recess. This lug and claw are adapted to be received in an axial slideway of the shoe so as to ensure the function of guiding before locking. At the rear of the bearing plate are arranged two movable claws located laterally facing each other, on opposite sides of the pedal. These claws are adapted to coact with locking members of the shoe and are provided for this purpose with hooking recesses on the contact faces approximately longitudinally conjugated of said members. These claws are associated with resilient means of the transverse spring type which interconnect them and urge them in a direction toward their hooking recess, such that pressure of the rear portion of the foot on the pedal effects spreading of the rear claws and hooking of the claws that secure the shoe to the pedal.

These automatic pedals of known type are generally satisfactory, but have the drawback of a very limited range of adjustment of the spring force, such that the cyclist encounters difficulty in rapidly obtaining optimum reproducible adjustment according to his size.

SUMMARY OF THE INVENTION

An object of the invention is to improve automatic pedals, by increasing the sensitivity of the range of adjustment of the resilient means coacting with the rear claws of the automatic pedal.

Another object of the invention is to permit simultaneous adjustment of the two sides of the automatic pedal, in the case of a so-called "reversible" automatic pedal, which is to say having two gripping surfaces.

The invention has for its object an automatic bicycle pedal, of the type comprising a fixed forward locking configuration to lock the forward end of a plate fixed on a cyclist's shoe and a movable rear configuration to lock the rear end of said fixed plate on the cyclist's shoe; said movable configuration being prestressed by resilient means for displacement under pressure of the cyclist's shoe, between an open spaced position permitting the insertion of the plate between the two locking configurations and a closed locking position ensuring the securement of the plate and the shoe with the automatic pedal, characterized in that the resilient means is compression means of an elastomeric block or of analogous resilient material, between two walls displaceable relative to each other to permit the adjustment of the locking force of the plate on the pedal.

A notable advantage of the invention is to provide several possibilities to install the adjustment system for the hardness of locking. This adjustment system can compress the elastomeric block from several directions, which is advantageous for the construction of the pedal.

According to other characteristics of the invention:

the pedal is a reversible pedal comprising two locking surfaces;

the compression of the elastomeric block is effected substantially parallel to the axis of mounting of the automatic pedal on the pedal lever;

the compression of the elastomeric block is effected transversely, preferably substantially perpendicular to the mounting axis of the automatic pedal on the pedal lever;

the compression is effected on a solid elastomeric block between two parallel walls of which one is fixed relative to the automatic pedal and of which the other is displaceable by actuation of a screw or like adjustment means of the locking force;

the compression is effectuated on a pierced elastomeric block between two parallel walls of which one is secured to the movable locking configuration at the rear of the automatic pedal and of which the other is movable relative to the automatic pedal, and at least one screw or like member for adjustment of the locking force passes through the pierced elastomeric block and ensures its compression by movement of the two walls toward or away from each other;

a movable member bears on a displaceable wall compressing the elastomer or like resilient material to ensure the adjustment of the locking force;

a movable member, for example a screw, coacts with a cooperating configuration, for example a nut of a displaceable wall compressing the elastomer or like resilient material to displace directly this displaceable wall;

the pedal comprises two blocks of elastomer, each elastomeric block being provided to determine the locking force of each locking surface and the pedal comprises a single adjustment means ensuring simultaneously substantially the same compressive force on each elastomeric block;

the single adjustment means comprises a stirrup with two ends of which each bears on one wall for compressing a corresponding elastomeric block;

said stirrup with two ends is displaceable under the action of an adjustment screw bearing centrally on the stirrup;

the elastomeric block or like resilient material is compressed in a first direction by the displacement of said two lateral walls and expands in a second direction substantially transverse to said first direction whilst exerting a resilient force on an element forming a lever of the rear locking arrangement;

the elastomeric block is a substantially parallelepipedal block disposed in a recess of the pedal delimited by a movable compression wall and a wall secured to the element forming a lever of the rear locking arrangement;

the elastomeric block or like resilient material is compressed by the displacement of the two lateral walls in a direction substantially parallel to the displacement of a wall secured to the movable rear locking arrangement;

the movable rear locking arrangement has a transverse U-shaped section of which one leg constitutes a wall in contact with the elastomeric block and of which another leg constitutes a retaining claw for a cleat;

the movable rear locking arrangement has an opening with two opposite edges constituting adjustment abutments for the locking force;

the movable wall opposite the wall of U-shaped configuration in contact with the elastomeric block is settable in position in a reproducible manner, so as to provide reproducible adjustment of the locking force;

the movable wall opposite the U-shaped wall in contact with the elastomeric block has one end which engages in said opening whilst being visible from outside;

said end is settable relative to an adjacent graduated scale, secured to said opening;

the elastomeric block or like resilient material has a high hardness characteristic greater than 70 Shore A, so as to place the movable locking arrangement continuously under high prestress without the elastomeric block overheating.

BRIEF DESCRIPTION OF THE DRAWINGS

The invention will be better understood from the description which follows given by way of non-limiting example, with reference to the accompanying drawings, in which:

FIG. 3 shows schematically a view in the direction of arrow III of FIG. 1 of an automatic pedal according to the invention.

FIG. 4 shows schematically a cross-sectional view on the line IV—IV of FIG. 2 of an automatic pedal according to the invention.

FIG. 7 shows schematically an end view in the direction of the arrow VII of FIGS. 5 and 6, of an automatic pedal according to the invention.

FIG. 8 shows schematically a transverse cross-sectional view on the line VIII—VIII of FIGS. 5 and 6, of an automatic pedal according to the invention.

FIG. 9 shows an enlarged fragmentary view in the direction of the arrow IX—IX of FIGS. 6, 7 and 8 of an automatic pedal according to the invention showing the adjustment of the locking force.

DETAILED DESCRIPTION OF THE INVENTION

Figure 1:
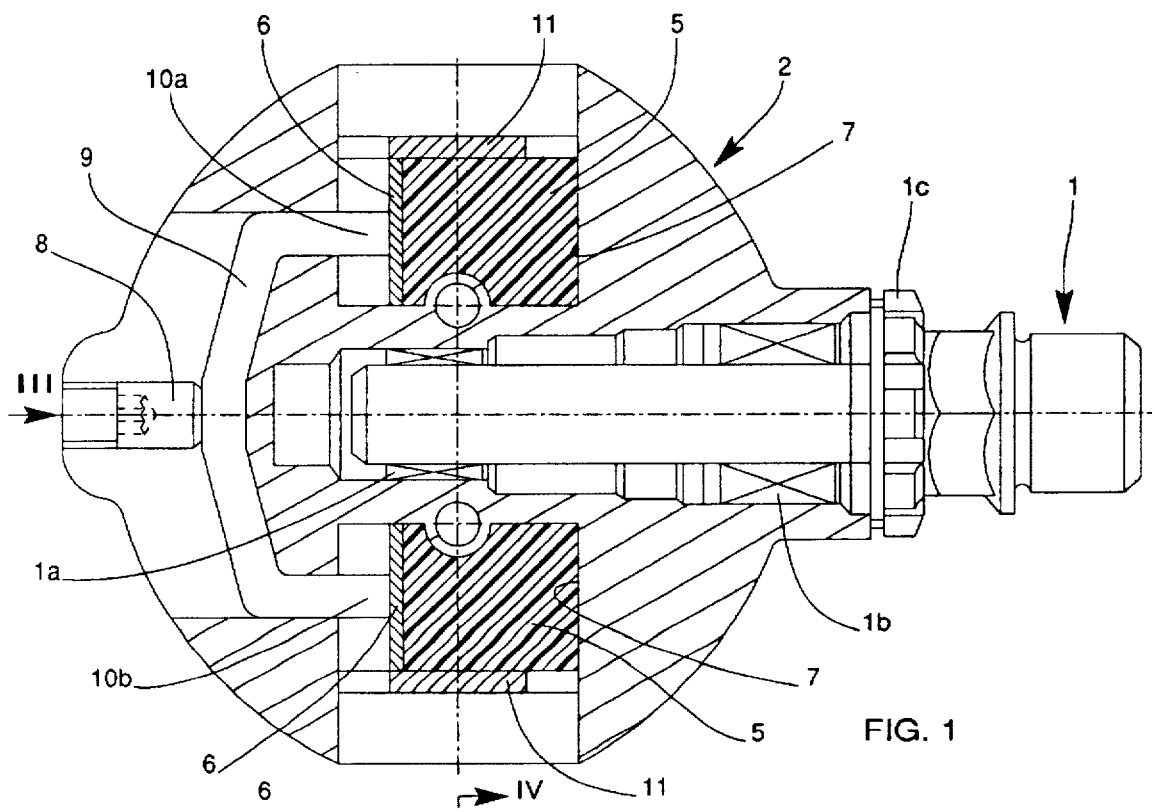
FIG. 1 shows schematically a cross-sectional view along the line I—I of FIG. 3, of an automatic pedal according to the invention in maximum locking force position.

Referring to FIGS. 1–4, an automatic pedal according to the invention comprises an axle 1 for mounting the automatic pedal on a pedal lever (not shown), a principal body 2 with a locking arrangement 3 fixed relative to the body and a movable locking arrangement 4 displaceable and prestressed by elastic means 5.

In a known manner, the automatic cycle pedals comprise generally the fixed locking arrangement 3 at the front to lock the forward end of a cleat fixed on a cyclist's shoe and the movable locking arrangement 4 at the rear to lock the rear end of said fixed cleat on said cyclist's shoe. The movable rear arrangement prestressed by the elastic means 5 is displaceable under the pressure of the cyclist's shoe between an open spaced position permitting insertion of the cleat between the two arrangements 3 and 4 and a closed locking position ensuring the securement of the cleat of the shoe to the automatic pedal.

According to the invention, the elastic means comprises a block 5 of elastomeric or like resilient material compressed in a reproducible manner between two walls 6 and 7 displaceable relative to each other to permit the adjustment of the locking force of the cleat onto the pedal.

The invention is applicable to simple pedals comprising a single locking surface, but it is also applicable preferably to reversible pedals comprising two locking surfaces, of which an example is shown in FIGS. 1 to 4. In reversible pedals of known type, it is usual to provide the mounting axle 1 of the automatic pedal on the pedal lever dismountably by a needle bearing 1a and a roller bearing 1b, and a locking nut 1c, as well as to provide the fixed locking arrangements 3 in the form of two members of sheet metal forwardly curved and fixed to each other via the body 2 by suitable members 3a. This known arrangement requires machining recesses, holes and corresponding tappings in the body 2 and requires no more detailed description.

In this embodiment of the invention, the compression of an elastomeric block 5 is effected by the displacement of the surface 6 substantially parallel to the mounting axle 1 of the automatic pedal on the pedal lever. The block 5 of elastomer is a solid block disposed between the two parallel walls 6 and 7; the wall 7 is fixed relative to the body 2 of the automatic pedal and the wall 6 is displaceable under the action of an adjustment screw 8 of the locking force.

To this end, the adjustment screw 8 bears on a stirrup 9, and the stirrup 9 bears itself on the displaceable surfaces 6 to compress the elastomeric block 5. Preferably, in the case of a reversible pedal, there are provided two elastomeric blocks 5 and the pedal comprises a single adjustment means ensuring simultaneously substantially the same compressive force on each elastomeric block 5 of each locking surface. In the illustrated example, the single adjustment means comprises the adjustment screw 8 bearing in the central position on the member 9 shaped as a stirrup. The opposite ends 10a, 10b of the stirrup 9 each bear on a displaceable surface 6 for compression of the elastomer. Thus, because of the central bearing of the adjustment screw 8 on the stirrup 9, the displacement imposed by the ends 10a and 10b of the stirrup 9 of the elastomer compression surfaces 6 is substantially identical, such that the elastomeric block compressed under substantially identical conditions transmits to each movable locking arrangement 4 locking forces that are substantially identical.

Figure 2:
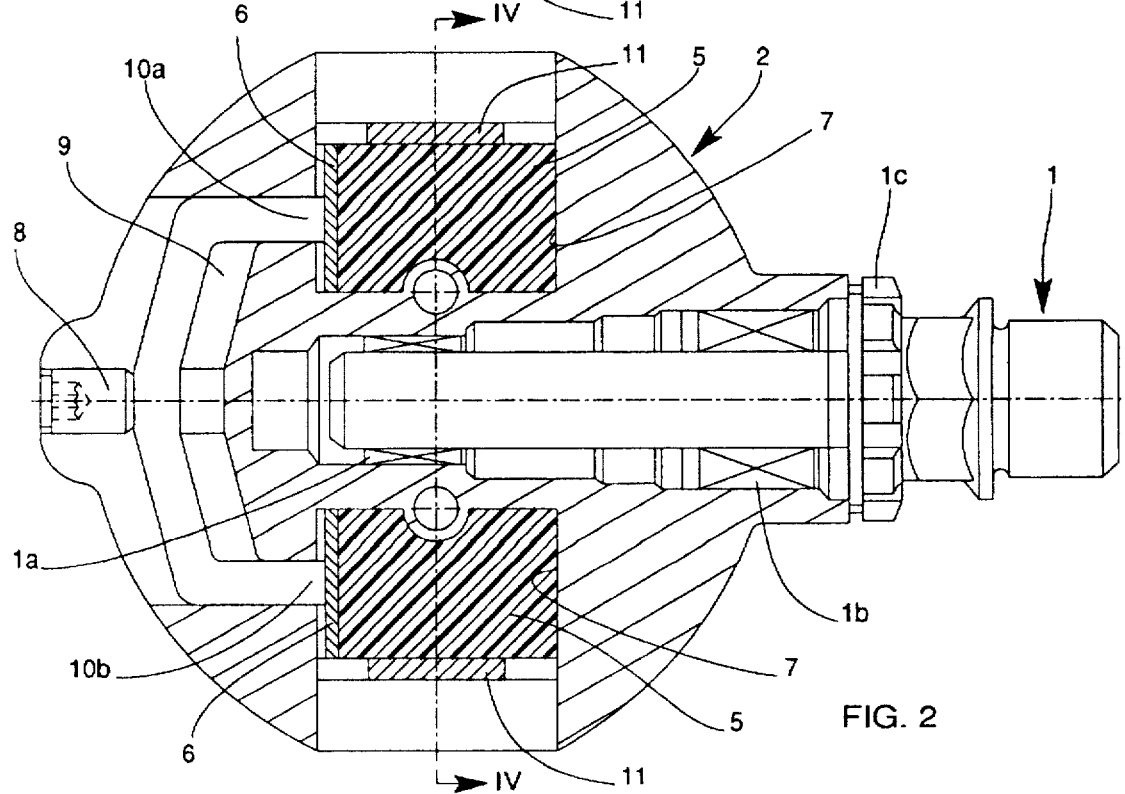
FIG. 2 shows schematically a cross-sectional view along line I—I of FIG. 3 of an automatic pedal according to the invention in the position of minimum locking force.
Figure 5:
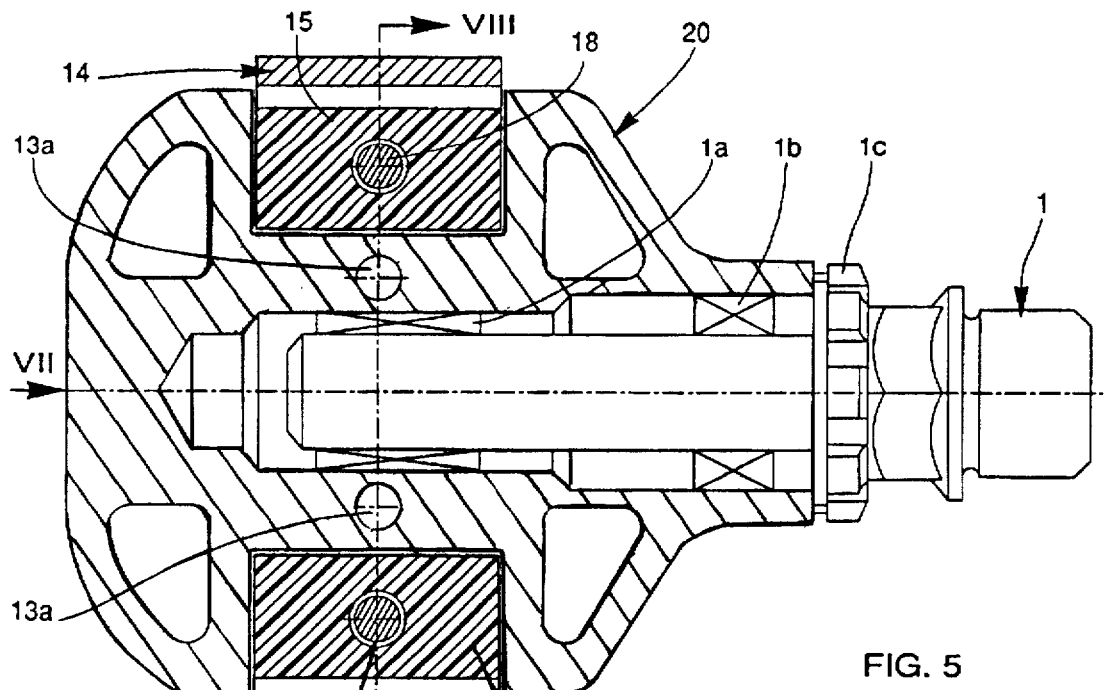
FIG. 5 shows schematically an axial cross-sectional view in a longitudinal plane of symmetry of another automatic pedal according to the invention.
Figure 6:
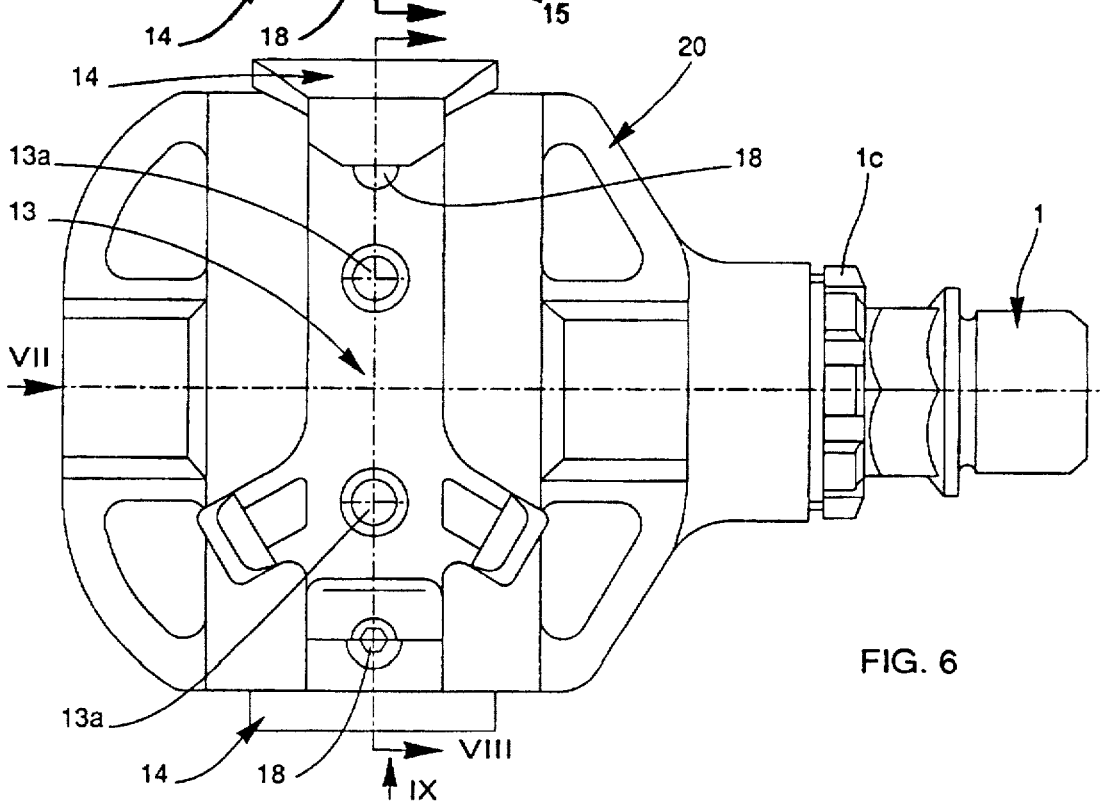
FIG. 6 shows schematically a view from above in the direction of the arrow VI of FIG. 7, of an automatic pedal according to the invention.

Each elastomeric block 5 is compressed in a direction parallel to the axle 1 by the displacement of each lateral wall 6 and expands in a direction substantially transverse to the axle 1 whilst exerting yieldable force on an element 11 forming a lever of the rear locking arrangement 4. To effect the mounting of the automatic pedal according to the invention, the substantially parallelepipedal blocks 5 are first disposed in the corresponding recesses of the body 2 limited by a wall secured to the element 11 forming a lever of the rear locking arrangement 4; the compressive surfaces 6 are inserted through an appropriate slot of the recess provided in the body 2 and there is exerted a force by means of these surfaces 6 on the elastomeric blocks with the aid of the stirrup 9 and of the screw 8, as shown in FIG. 2 corresponding to the minimum locking force. The screw 8 is then tightened to compress the elastomeric blocks simultaneously thanks to the stirrup 9 and to the surfaces 6, to a position corresponding to the desired locking force, lower than the maximum locking force corresponding to the position of FIG. 1.

Preferably, the end 11 forming a lever of the movable locking arrangement is of a single piece with the latter, for example by bending a suitable steel sheet to obtain the cross section shown in FIG. 4: this cross section comprises two substantially straight ends, of which one bears the locking claw, interconnected by a semicircular portion pivoting about an axle 12 secured to the body 2.

The pivoting of the arrangement 4 about the axle 12 takes place between a position shown in phantom line in FIG. 4 and corresponding to an open spaced position permitting the intersection of the cleat of the cyclist's shoe between the two locking arrangements 3 and 4, and a closed locking position shown in full line and ensuring the securement of the cleat and of the shoe with the automatic pedal.

The pivoting axles 12 are preferably mounted slidably in recesses of the body 2, so as to facilitate the successive mounting of the elastomeric blocks 5, of the arrangements 4 and of their lever 11, of the axles 12, of the compression surfaces 6 and of the bearing members 8 and 9.

The advantage of this embodiment is to provide a force transmission on two perpendicular surfaces and to place the locking arrangement 4 continuously under a strong prestress by using an elastomeric block or resilient material having a high hardness characteristic greater than 70 Shore A, which has the effect of avoiding any excessive wear of the elastomeric block when the cleat is locked and retained on the pedal.

Moreover, the wear of the two blocks 5 is substantially identical, because of the balanced force provided by the compression surfaces 6 by means of the stirrup 9 transmitting forces in a balanced manner from one end 10a to the other end 10b.

Referring to FIGS. 5 to 9, a second embodiment of automatic pedal according to the invention comprises an axle 1 for securement of the automatic pedal on a pedal lever, made preferably in the form of an axle with bearings 1a, 1b and a. securement nut 1c, a body 20 having recesses to lighten the automatic pedal, a fixed locking arrangement 13 and a movable locking arrangement 14 adapted to be spaced apart to secure a cleat of the shoe with the automatic pedal.

The movable locking arrangement 14 is prestressed by elastic means comprising an elastomeric block 15 compressed between two surfaces 16 and 17 displaceable relative to each other to permit the adjustment of the locking force of the cleat on the pedal.

In the case of a reversible pedal, the two fixed arrangements 13 are mounted on the two opposite locking surfaces and secured to each other by corresponding members 13a, whilst the movable locking arrangements 14 are each mounted trapped in contact with each corresponding elastomeric block 15 or like resilient material.

The compression of the elastomeric block 15 is thus effected transversely, preferably substantially perpendicular to the mounting axle of the automatic pedal on the pedal lever. This arrangement permits reducing the width of the automatic pedal and permits providing a lighter and more compact arrangement. The elastomeric block 15 is pierced and is compressed between parallel walls 16 and 17. The wall 16 is secured to the movable locking arrangement 14 at the rear of the automatic pedal and the wall 17 is movable relative to the automatic pedal and comprises a tapping or a nut 17a coacting with an adjustment screw 18 to displace directly this displaceable wall 17 by compressing the elastomer 15. In the case of a reversible pedal, the adjustment screws 18 comprising a hexagonal impression or a slot at one end or the other end of the screw are not controlled by a single adjustment means, such that it is possible to adjust independently one or the other locking surface of the automatic pedal. To recognize the surface on which the predetermined adjustment has been effected, it is preferable to provide a marking or a color difference permitting recognizing a locking surface relative to the other locking surface.

The compression plate 16 for the elastomeric block moves by being guided relative to the body 20, such that the elastomeric block or like resilient material will be compressed in a direction substantially parallel to the movement of the wall 17 secured to the rear movable locking arrangement 14. To this end, it is provided that the rear movable locking arrangement 14 has a substantially U-shaped cross section, of which one leg 14a constitutes the wall 16 in contact with the elastomeric block 15 and of which the other leg 14b constitutes a retaining hook for a cleat (not shown) secured to a cyclist's shoe. Thus, thanks to the invention, the elastomeric block 15 is compressed in the manner of an accordion, when the locking hook 14b is spaced under the pressure of the cyclist's shoe, to come into the position shown in broken line in FIG. 8, whilst in the position corresponding to retention and holding of the cleat and of the shoe on the automatic pedal, the elastomeric block is compressed substantially symmetrically according to the positions shown in full lines in FIGS. 5 to 8.

The lever effect is thus produced directly by the deformation of the accordion of the elastomeric block 15. To avoid excessive deformation of the elastomeric block 15, it is preferably provided to mount the elastomeric block 15 secured to the plate 17 and of the tapping or nut 17a, so as to avoid any separation of the shoe or any undesirable deformation.

Preferably, the displaceable wall 17 opposite the wall 16 of the movable arrangement 14 having a transverse U-shaped cross section, is settable in a position in a reproducible manner. To this end, it is provided that the wall 17 has an end 17a which engages in an opening 14c provided in the base of the U-shaped arrangement 14. Preferably, as shown in FIG. 9, the opening 14c is an opening having two opposite edges constituting adjustment abutments for the displacement of the compression plate 17 and thus limiting the maximum and minimum values of the locking force. The end 17a is visible through the opening 14c and moves from a position of minimum locking force shown in broken lines, to a position of maximum locking force shown in full lines, while remaining continuously visible through the opening 14c and while thus providing a reproducible indication of the locking force. Preferably, there is provided a graduated scale 19 on the side of opening 14c to permit the cyclist to perform easily an adjustment of the desired locking force. The graduated scale 19 adjacent the opening 14c can be incised or, alternatively, can be provided in the form of a combination of several colors.

To produce the assembly comprising the plate 17 and the elastomeric block 15, it is preferable to proceed by overmolding or vulcanization of an elastomeric material or like resilient material (polyurethane or the like) on a previously machined and tapped plate, to the final shape.

The elastomeric block or resilient material also has in this case a high hardness characteristic greater than 70 Shore A, so as to place the movable locking arrangement constantly under a strong prestress without the elastomeric block excessively expanding.

The invention described with reference to two particular embodiments is in no way limited but covers on the contrary all modifications of shape and any variations of embodiment in the scope and spirit of the invention involving the compression of a block of resilient material and the use of a lever force to predetermine a locking force and a retention force of a movable locking arrangement of an automatic pedal. The lever effect can be obtained by a pivoting mechanical lever or by a non-isotropic deformation of the elastomeric block, for example an accordion deformation.

What is claimed is:

1. In an automatic bicycle pedal comprising a forward fixed locking arrangement (3, 13) to lock the forward end of a cleat fixed on a cyclist's shoe and a rear movable locking arrangement (4, 14) to lock the rear end of said cleat fixed on said cyclist's shoe; said movable locking arrangement (4, 14) being prestressed by elastic means (5, 15) for displacing under the pressure of the cyclist's shoe, the movable locking arrangement between an open spaced position permitting the insertion of the cleat between the locking arrangements (3, 13; 4, 14) and a closed locking position ensuring the securement of the cleat and of the shoe with the automatic pedal; the improvement wherein the elastic means (5, 15) comprises a compressible block (5, 15) of resilient material between two walls (6, 16; 7, 17) movable relative to each other to permit the adjustment of the locking force of the cleat on the pedal.

2. Automatic pedal according to claim 1, wherein the pedal is a reversible pedal comprising two locking surfaces.

3. Automatic pedal according to claim 1, wherein the compression of the block (5) is effected substantially parallel to a mounting axle (1) of the automatic pedal on a pedal lever.

4. Automatic pedal according to claim 1, wherein the compression of the block (15) is effected transversely to a mounting axle (1) of the automatic pedal on a pedal lever.

5. Automatic pedal according to claim 1, wherein the compression is effected on a solid block (5) of elastomer between two parallel walls (6, 7) of which one (7) is fixed relative to the automatic pedal and of which the other (6) is displaceable by actuation of a screw (8) for the adjustment of the locking force.

6. Automatic pedal according to claim 1, wherein the compression is effected on a pierced elastomeric block (15) between two parallel walls (16, 17) of which one (16) is secured to the movable locking arrangement (14) at the rear of the automatic pedal and of which the other (17) is movable relative to the automatic pedal, and wherein at least one screw (18) for adjusting the locking force passes through the pierced elastomeric block (15) and ensures compression of the latter by bringing together the two walls (16, 17).

7. Automatic pedal according to claim 1, further comprising a movable member (9) that bears on a displaceable wall (6) compressing the resilient block (5) to ensure the adjustment of the locking force.

8. Automatic pedal according to claim 1, further comprising a movable member (18) that coacts with a cooperating arrangement (17a) of a movable wall (17) compressing the resilient block (5), to displace directly said movable wall (17).

9. Automatic pedal according to claim 2, wherein the pedal comprises two elastomeric blocks (5), each elastomeric block (5) being provided to predetermine the locking force of each locking surface, and the pedal comprises a single adjustment means (8, 9) ensuring simultaneously substantially the same compressive force on each elastomeric block (5).

10. Automatic pedal according to claim 9, wherein the single adjustment means (8, 9) comprises a stirrup (9) with two ends (10a, 10b) of which each bears on a wall (6) for compression of a corresponding block (5).

11. Automatic pedal according to claim 10, wherein said stirrup (9) with two ends (10a, 10b) is displaceable under the action of an adjustment screw (8) bearing centrally on the stirrup (9).

12. Automatic pedal according to claim 1, wherein the block (5) is compressed in a first direction by the displacement of said two lateral walls (6, 7) and expands in a second direction substantially transverse to said first direction whilst exerting yieldable force on an element forming a lever (11) of the rear movable locking arrangement (4).

13. Automatic pedal according to claim 12, wherein the block (5) is a substantially parallelepipedal block disposed in a recess of the pedal delimited by a movable compression wall (6) and a wall (7) secured to the element forming a lever (11) of the rear movable locking arrangement (4).

14. Automatic pedal according to claim 1, wherein the block (15) is compressed by the displacement of the two walls (16, 17) in a direction substantially parallel to the displacement of a said wall (17) secured to the rear movable locking arrangement (14).

15. Automatic pedal according to claim 14, wherein the rear movable locking arrangement (14) has a U-shaped transverse cross section of which one leg (14a) constitutes a wall (16) in contact with the block (15) and of which the other leg (14b) constitutes a cleat-retaining claw.

16. Automatic pedal according to claim 15, wherein the rear movable locking arrangement (14) has an opening (14c) with two opposite edges constituting abutments for the adjustment of the locking force.

17. Automatic pedal according to claim 15, wherein the movable wall (17) opposite the wall (16) of the U-shaped configuration in contact with the block (15) is settable in position in a reproducible manner, so as to provide a reproducible adjustment of the locking force.

18. Automatic pedal according to claim 16, wherein the movable wall (17) opposite the wall (16) of the U-shaped configuration in contact with the block (15) has an end (17a) which engages in an opening (14c) in the U-shaped configuration whilst being visible from the outside.

19. Automatic pedal according to claim 18, said end (17a) is settable relative to an adjacent graduated scale (19) secured to said opening (14c).

20. Automatic pedal according to claim 1, wherein the block (5, 15) has a high hardness characteristic greater than 70 Shore A.

* * * * *